UNITED STATES PATENT OFFICE.

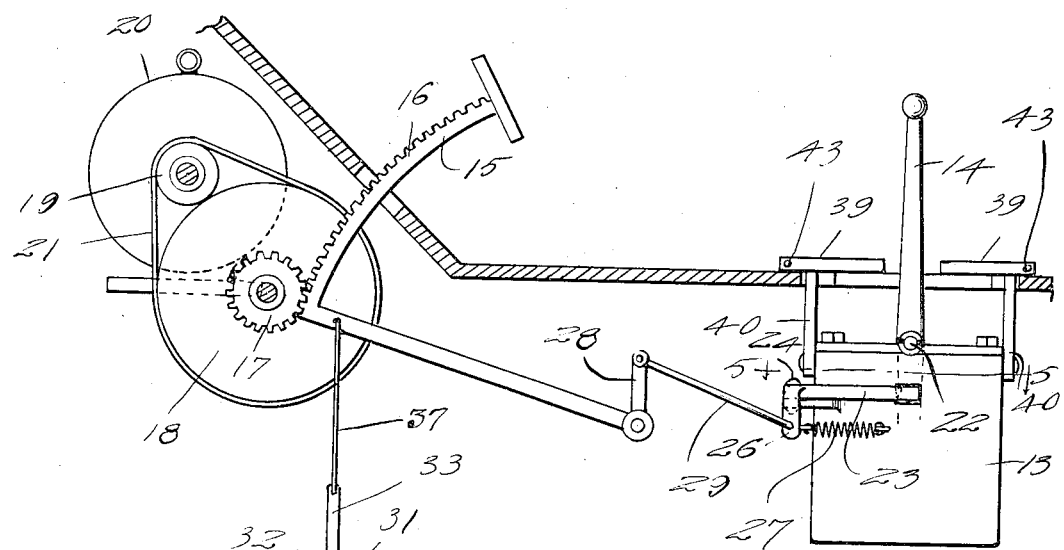

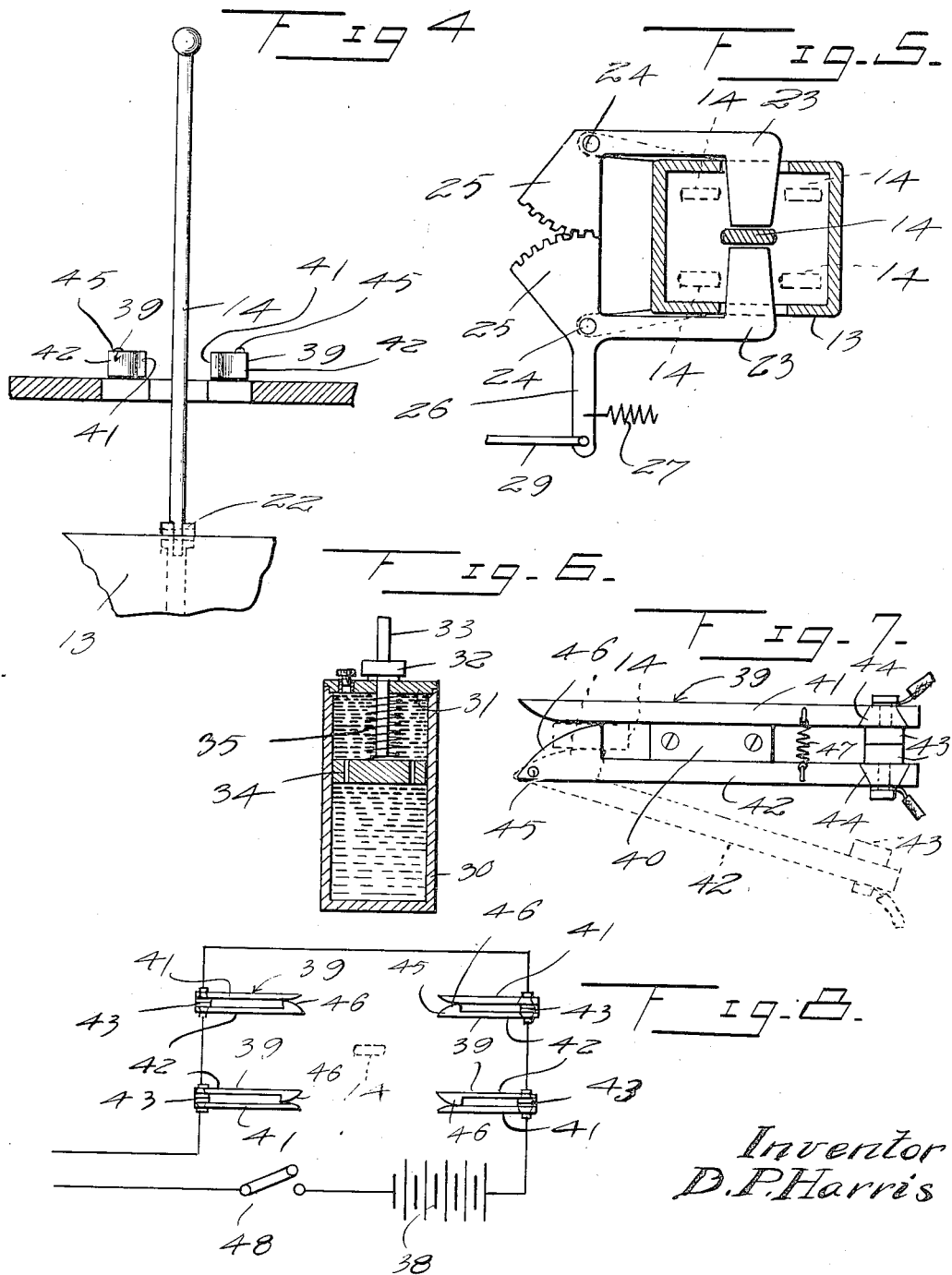

DONALD P. HARRIS, OF JERSEY SHORE, PENNSYLVANIA.

DEVICE FOR SYNCHRONIZING CLUTCH AND GEAR SETS ON MOTOR-VEHICLES.

1,380,900.   Specification of Letters Patent.   Patented June 7, 1921.

Application filed March 9, 1920. Serial No. 364,552.

*To all whom it may concern:*

Be it known that I, DONALD P. HARRIS, a citizen of the United States, residing at Jersey Shore, in the county of Lycoming and State of Pennsylvania, have invented certain new and useful Improvements in Devices for Synchronizing Clutch and Gear Sets on Motor-Vehicles; and I do hereby declare the following to be a full, clear, and exact description of the invention, such as will enable others skilled in the art to which it appertains to make and use the same.

This invention relates to an improved device for synchronizing the clutch and gear set on a motor vehicle and one object of the invention is to so construct this device that the clutch may be thrown out of mesh when shifting the gears thus preventing stripping of the gears during the shifting process.

Another object of the invention is to so construct this device that the clutch may be returned to an operative position and brought into an operative position a short time after the shifting of the gears has been completed.

Another object of the invention is to so construct this device that the clutch may be operated through the medium of an electric motor having positioned in its circuit switches placed adjacent the gear shifting lever and moved to a closed position prior to the shifting of the gears thus permitting the proper action.

Another object of the invention is to provide means for retarding movement of the clutch to an operative position thus permitting the gears to be shifted prior to the return of the clutch to an operative position.

This invention is illustrated in the accompanying drawings, wherein:

Figure 1 is a side elevation of a motor provided with the improved device.

Fig. 2 is a top plan view showing the relation of the gear shifting lever to the switches.

Fig. 3 is a section taken along the line 3—3 of Fig. 2.

Fig. 4 is a section taken along the line 4—4 of Fig. 2.

Fig. 5 is a section taken along the line 5—5 of Fig. 1.

Fig. 6 is an enlarged longitudinal sectional view through the dash pot.

Fig. 7 is an enlarged plan view of one of the switches positioned adjacent the gear shifting lever.

Fig. 8 is a diagram showing the wiring.

My improvements are adapted for association with motor vehicles of the usual type. A neck 13 may extend from the gear housing to mount the gear shifting lever designated 14. The clutch is provided with the actuating pedal 15 which is also of a conventional construction excepting that this treadle is provided with teeth forming a rack 16 which engages the pinion 17 carried by a rotatably mounted pulley 18 which pulley is to receive rotary movement from a pulley 19 carried by the shaft of an electric motor 20 through the medium of the belt 21. The gear shifting lever 14 is slightly different from the conventional construction of lever in that it is formed in two sections which are pivotally connected through the medium of the joint 22. It will thus be seen that the upper section of this lever may have a slight rocking movement upon its pivot before the lever is moved as a whole and the gears shifted.

It is desired to have a shifting lever locked against accidental movement out of a desired position and in order to do this there has been provided dogs 23 which are pivotally mounted as shown at 24 to extend into the neck 13 upon opposite sides of the lever and have their outer end portions provided with arms 25 having gear segments at their free ends which mesh so that when one of the dogs is moved a similar movement will be transmitted to the second dog. One of these dogs is provided with a lever extension 26 which is engaged by a spring 27 serving to yieldably retain the dogs in the locking position. An arm 28 extends from the treadle 15 and is connected with the lever arm 26 by means of a cable or other flexible connection 29 thereby permitting movement to be transmitted from the treadle to the dogs or from the dogs to the treadle. After the treadle has been moved downwardly it is desired to have it retarded in its upward movement and there has therefore been provided a dash pot or check which is positioned beneath the treadle. This dash pot is provided with a cylinder 30 having a cap 31 from which extends a neck or oil tight bushing 32 through which extends the shaft or stem 33 of the piston 34. This piston, which is normally retained in a lowered position through the medium of the spring 35, is provided with openings 36 through which oil or a similar element will pass when the piston is moving in the cylinder and it will thus be readily seen that since the treadle is connected with this piston stem or shaft through the medium of the cable or other flexible connection 37, movement of the treadle toward a raised position after having been moved downwardly will be retarded. The treadle may, however, be moved downwardly rapidly since the flexible connection does not prevent the treadle from moving downwardly independent of the movement of the piston.

In order to control the flow of current from the battery 38 to the motor 20, there has been provided switches 39 which are positioned upon supports 40 located about the gear shifting lever 14 as shown in Fig. 2. Each of these switches is constructed as shown clearly in Fig. 7 and is provided with side bars 41 and 42 which carry contact points 43 insulated from the side bars as shown at 44 and connected with the wires forming the circuit. The side bar 41 is stationary and the side bar 42 is movable and pivotally mounted as shown at 45, a cam head or extension 46 being provided for permitting the movable arm to be swung away from the stationary arm and a spring 47 being provided to yieldably retain the arm in the normal position with the contact points 43 in engagement. When the shifting lever is in the neutral position shown in Fig. 2, it is desired to permit the circuit to the motor to be broken and there has therefore been provided a cutout switch 48 which will be located at any convenient point in the circuit where it may be easily reached. This cutout switch is provided with a conventional construction.

When in use the motor will be started in the usual manner with the gear shifting lever in neutral and the switch 48 being closed, the motor 20 through the medium of the pulley 18 and pinion 17 will cause the treadle to be moved downwardly thus throwing the clutch out of an operative position. The gear shifting lever can then be moved to the first speed. When the lever passes between the side bars of the switch 39 associated with this first speed position, the circuit through the motor will be broken thus permitting the treadle to be moved upwardly. The treadle will however be checked in its upward movement by the dash pot and the lever will have ample time to make the proper gear shift before the clutch moves into an operative position and the dogs move into a locking position. After the car has started on first speed, the lever will be moved to the second speed position and in doing so the upper portion of the lever will be first moved out of engagement with the switch 39 of the first speed position thus closing the switch and causing the motor to move the clutch to an inoperative position and causing the dogs to be swung out of an operative position. The shift can then be made to the second speed position and the circuit will be broken as previously described thus cutting off the flow of current to the motor and permitting the clutch to be moved into the operative position. When making this shift it is not necessary for the same length of time to elapse as was desirable when making the first change from neutral to first speed and therefore the flexible connection 37 has been provided so that the clutch can be thrown entirely out of gear and the treadle then moved upwardly to take up the slack in the cable 37 before the dash pot or check comes into operation. The same operation will be repeated when shifting from second to third speed or from third speed to neutral but, of course, when moving to neutral the shifting lever will be left in the position shown in Fig. 2 and the piston 34 will move to the bottom of the cylinder thus providing ample time for the change to be made to reverse if desired without danger of stripping the gears. It is not necessary to have the clutch out of an operative position when the automobile is standing still at a curb and therefore the switch 48 has been provided so that the flow of current to the motor can be cut off when the shifting lever is in the neutral position. It will thus be seen that with this construction there is no danger of the gears being stripped when shifting from one speed to another. If it is desired to move from neutral to first speed or reverse and switch 48 is open this can be done since when moving the lever it will engage one of the dogs and sufficient pressure will force the dogs outwardly, the cable or flexible connection 29 permitting of this movement.

What is claimed is:

1. A structure of the character described comprising a gear shifting lever, a clutch shifting treadle, movably mounted locking dogs for the gear shifting lever having operative connection with the clutch operating treadle, a dash pot having a flexible connection with the treadle for retarding movement of the treadle in one direction, electrically operated means for imparting movement to the treadle in one direction, and an energizing circuit for the electrically operated means including switches positioned in operative relation to the gear shifting lever and moved to an open position to break the circuit when the lever is moved to shift the gears.

2. The combination with a motor including a gearing having a shifting lever and a clutch having an actuating treadle, of electrically operated means having operative connection with the treadle for moving the same in one direction, a dash pot having a flexible connection with the treadle for permitting free movement of the same in one direction and retarding movement of the treadle in the opposite direction, and a circuit for energizing the electrically operated means and including switches positioned in operative relation to the gear shifting lever, the switches being normally closed and moved to an open position by the lever.

3. The combination with a motor including a clutch actuating treadle and a gear shifting lever of a dash pot having connection with the treadle for retarding movement of the same in one direction, an electric motor having operative connection with the treadle for moving the same in one direction, dogs for locking said lever having operative connection with the treadle whereby the dogs will be moved to an inoperative position when the treadle is moved downwardly by the electrically operated means, and a circuit for energizing the motor including switches positioned in operative relation to the gear lever and normally closed, the switches being moved to open position through the medium of said lever.

4. A structure of the character described comprising a gear actuating lever, a clutch actuating treadle, a dash pot having a cylinder, a cap for the cylinder, a piston slidably mounted in the cylinder and provided with liquid passages, a piston rod extending from the piston through the cap, a spring positioned about the piston rod between the piston and cap, flexible means connecting the outer end of the piston rod with the treadle, an electrically operated motor having operative connection with the treadle for moving the treadle downwardly, and a circuit for energizing the motor including a switch positioned in operative relation to the lever and normally closed, the switch being moved to an open position through the medium of the lever.

5. A device of the character described comprising a gear shifting lever, a clutch actuating treadle, electrically operated means for imparting movement to the treadle in one direction, and a circuit for energizing the electrically operated means including switches positioned in operative relation to the lever, each switch having a support, a stationary side bar, a movable side bar pivotally mounted and provided with a cam extension adjacent its pivoted end for engagement by the lever, contact points carried by the side bars, resilient means yieldably retaining the side bars in position with the contacts in engagement, said lever when engaging the cam extension moving the side bars to separate the contact points and break the circuit.

6. A device of the character described comprising a gear shifting lever, a clutch actuating treadle, the gear shifting lever having its upper portion pivotally connected with the lower portion whereby the upper portion of the lever may have swinging movement prior to movement by the lower portion thereof, electrically operated means having operative connection with the treadle for imparting movement to the same in one direction, and a circuit for energizing the electrically operated means including a switch positioned in operative relation to the upper end portion of the lever and normally in a closed position, the switch being moved to an open position through the medium of the upper portion of the lever.

In testimony whereof I affix my signature in presence of two witnesses.

DONALD P. HARRIS.

Witnesses:
DAVID S. RICHMON,
C. H. SUERSSEN.